United States Patent [19]

Niskin

[11] 4,091,666
[45] May 30, 1978

[54] COMBINED HOUSING AND STANDARD FOR WATER FLOW METERS

[76] Inventor: Shale J. Niskin, 2941 Lacaya, Miami, Fla. 33133

[21] Appl. No.: 810,415

[22] Filed: Jun. 27, 1977

[51] Int. Cl.² .............................................. G01F 15/18
[52] U.S. Cl. .................................................. 73/170 A
[58] Field of Search ..................... 73/170 A, 186, 189, 73/228; 9/8 R; 114/230

[56] References Cited

U.S. PATENT DOCUMENTS

| | | | |
|---|---|---|---|
| 3,327,968 | 6/1967 | Converse | 73/170 |
| 3,412,498 | 11/1968 | Niskin | 73/170 |
| 3,906,790 | 9/1975 | Brainard et al. | 73/170 |
| 3,971,251 | 7/1976 | Niskin | 73/170 |

*Primary Examiner*—Herbert Goldstein
*Attorney, Agent, or Firm*—Salvatore G. Militana

[57] ABSTRACT

A combined housing and standard for measuring current velocity and direction in a body of water wherein the housing is tubular in shape in which an inclinometer is mounted and connected to the standard for vertical movement of the housing along the standard, the latter being mounted on a vertically disposed anchoring line. A pair of flexible fins is symmetrically mounted on the housing for positioning the housing in a plane parallel to the directional flow of the current while the housing assumes a vertical tilt proportional to the velocity of the current; the inclinometer registering the compass reading and angle of tilt from which information the direction and velocity of the current are ascertained.

6 Claims, 8 Drawing Figures

COMBINED HOUSING AND STANDARD FOR WATER FLOW METERS

BACKGROUND OF THE INVENTION

1. Field of the Invention

This invention relates to apparatus for measuring water flow and is more particularly directed to a combined housing and standard for water flow meters.

2. Description of the Prior Art

The conventional cylindrical housings for current flow meters are so unstable that it is difficult to get accurate readings of the current velocity and directional flow from the inclinometer contained therein. These housings have no appendages mounted thereon while lying in a fast moving current of water to prevent the orbital and sideway swaying of the cylindrical housing and the jerky vertical movement thereof caused by the rise and fall of the waves. The present invention contemplates providing the cylindrical housings with means for preventing the cylindrical housing from being eratic in movement so that true readings of current velocity and direction are attained.

SUMMARY OF THE INVENTION

Therefore, a principal object of the present invention is to provide a cylindrical housing for determining accurate current velocity and direction with a pair of fins that compel the cylindrical housing to lie in the same plane as that of current flow and the fins lying in planes that intersect at the axis of the cylindrical housing.

Another object of the present invention is to provide a cylindrical housing containing instruments for determining accurate current velocity and direction with a pair of flexible fins that lie in planes that intersect at right angles to each other at the axis of the housing whereby the flexible fins increase the range of the current velocity readings.

A further object of the present invention is to provide a cylindrical housing containing instruments for determining current velocity and direction in a body of water with an attachment that prevents the housing from bobbing up and down with the wave action of the body of water.

A still further object of the present invention is to provide a cylindrical housing containing instruments for determining current velocity and direction in a body of water with a standard connected to a vertically disposed cable anchored at one end and having a float at the other end from transmitting the bobbing action of the float to the cylindrical housing.

With these and other object in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

DESCRIPTION OF THE PREFERRED EMBODIMENTS

Figure 1:
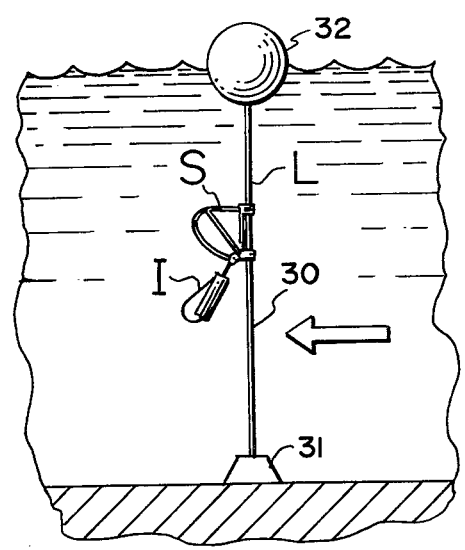
FIG. 1 is a vertical sectional view of a body of water showing my combined housing and standard for water flow meters secured to an anchored line.

Referring to the drawings wherein like numerals and letters are used to designate similar parts throughout the several views, the letters -I- refer to an inclinometer housing having a connecting member -C- joining the inclinometer -I- to a standard -S- which is mounted on an anchored line -L-.

The inclinometer housing -I- consists of a cylindrical housing 10 at whose end are cover plates 11 and 12 secured thereon to effect a watertight compartment 13 in the housing 10. Mounted on the outside surface of the front cover plate 13 is a rotatable eyebolt 21 to which a swivelled connector 15 is fastened. Mounted on the inside surface of the front cover member 13 is the conventional inclinometer 14. The latter is described in detail in my U.S. Pat. No. 3,372,585, issued on Mar. 28, 1968, for a Device For Recording Current Velocity And Direction In Bodies Of Water. Mounted on the inside surface of the cover plate 12 and secured thereto is a camera 16 that is directed to and focused on the inclinometer 14. By virtue of this arrangement of instruments the camera 16 can record the readings of the inclinometer, whether the readings are continuous or periodic.

It is to be noted that the inclinometer 14 will indicate two readings for every position of the housing 10, one reading is a compass bearing which indicates direction of current while the other reading will indicate an angular position in the vertical plane, which reading is a function of the velocity of the water current. Consequently each recording of the inclinometer 14 will indicate the direction and velocity of the current flow in the body of water.

In order that there be an accurate reading of the direction and velocity of water current and housing 10 must be anchored in the body of water, but free to lie in the plane of the water flow at a vertical angle as determined by the force of onrushing water current.

In order that the housing 10 will swing in the direction that the current is flowing, the housing 10 is provided with a pair of vanes or fins 17 mounted in planes that pass through the axis of the cylindrical housing 10 and form a central angle with each other at the axis of approximately 90°. The housing 10 secured at one end to the standard -S- by the connector -C- as explained in detail hereinafter will swing into and be maintained in the precise direction the current is flowing with the forces of the current impinging on and exerting an equal force on the surfaces of the two fins 17 so that a plane passing through the axis of the housing 10 will be common to that of the current flow and will be equidistantly positioned between the two fins 17. This structure prevents the housing 10 from fluttering from side to side as would occur if no fins were applied to the cylindrical housing.

Each of the fins 17 are provided with a base member 18 that is glued or otherwise secured to the outer surface of the cylindrical housing 10. The base members 18 have a pair of spaced and upstanding lug portions 19 forming a centrally disposed slot 20 for receiving the lower edge of the fin 17 and bolts 22 extending through lug portions 19 for securing the fins 17 to the base members 18.

Figure 7:
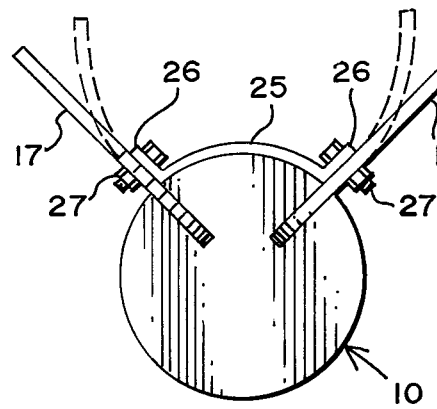
FIG. 7 is a view similar to FIG. 6 showing an alternate construction of the housing.

An alternate construction of fastening the fins 17 to the housing 10 is illustrated by FIG. 7 in which a braket 25 of the same curvature as the surface of the housing 10 is glued or otherwise fastened thereon having an upstanding lug portion 26 along each edge to which the fins 17 are fastened by bolts 27. The lugs 26 extend at angles that lie in planes that converge or intersect at right angle to each other at the axis of the housing 10. The effective range of the device -I- as to denoting the velocity of a current is increased greatly by utilizing fins or vanes 17 that are relatively flexible without loss of accuracy of the reading as to the direction of the flow of the current.

Figure 6:
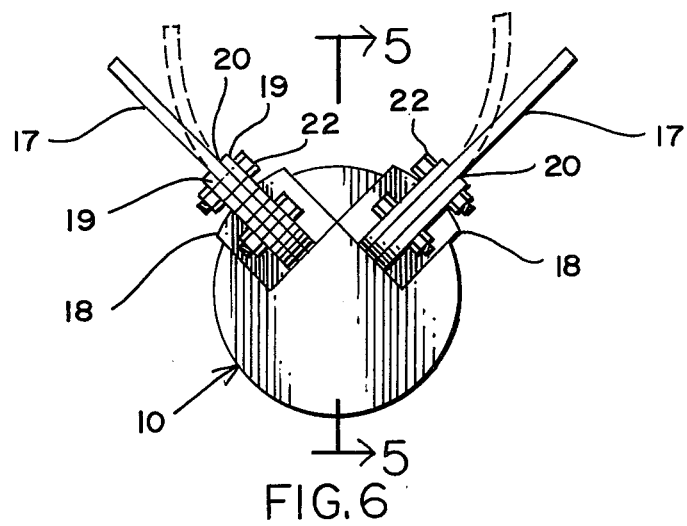
FIG. 6 is a rear elevational view.
Figure 8:
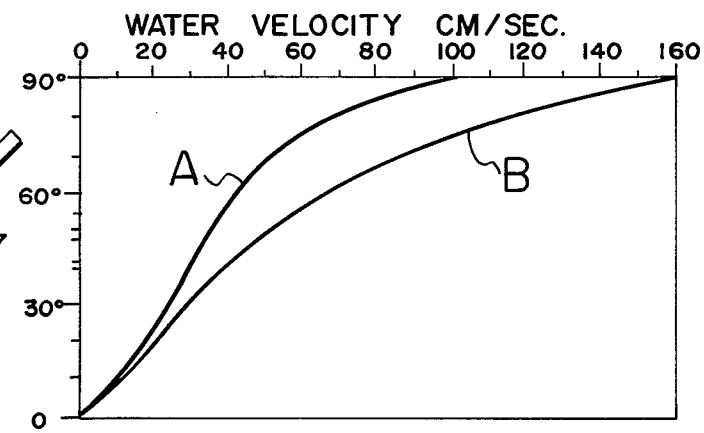
FIG. 8 is a graph comparing the operation of the present apparatus to that of apparatus having rigid fins or vanes.
Figure 5:
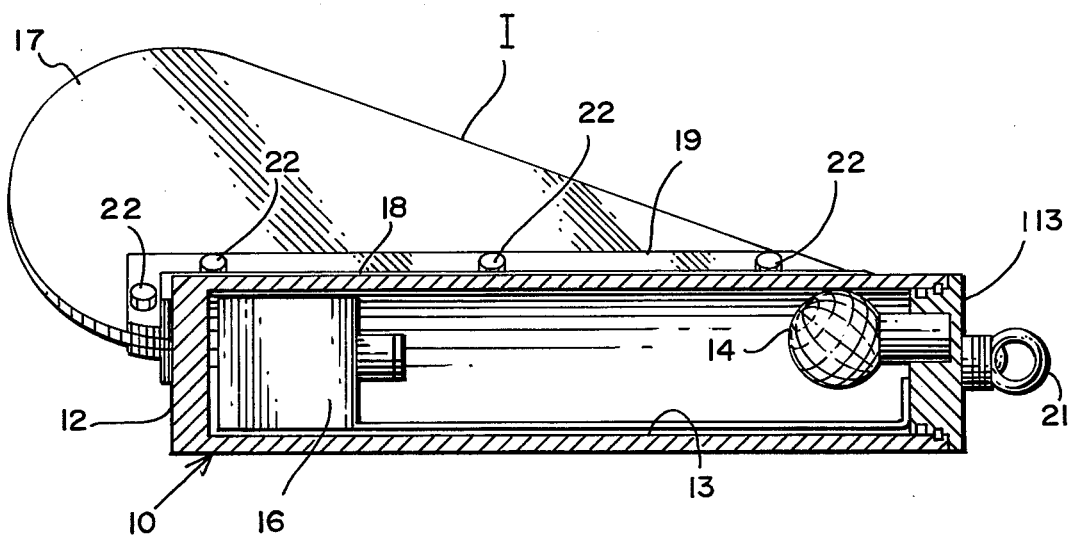
FIG. 5 is a cross sectional view taken along the line 5—5 of FIG. 6.

As shown by FIG. 8, the curves -A- and -B- are the result of plotting the actual velocity of the current as the abscissa and the vertical angular position of the housing 10 at the corresponding velocity as the ordinate. The curve -A- results from the use of fins on the housing 10 that are rigid or inflexible while that of the curve -B- have flexible fins 17 as indicated by dotted lines in FIGS. 6 and 7. It is readily noted that inclinometer housing using rigid fins as shown by curve -A- is incapable of determining velocity of water current beyond 100 cm/sec. while the inclinometer housing using flexible fins 17 shows water velocity readings up to 160 cm/sec. With the use of rigid fins, the drag on the housing is proportionate to the velocity of the water current while the flexible fins absorb some of the water forces to become flexed in proportion to the velocity of the water current to thereby increase its range of effectiveness inasmuch as the drag at low velocities are at a maximum and at a minimum at high velocities.

Figure 2:
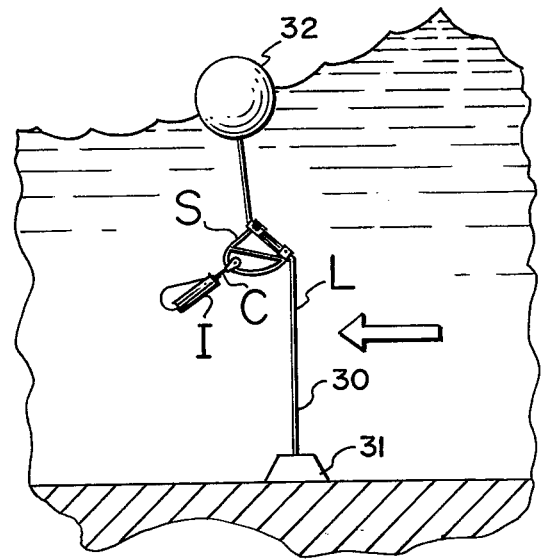
FIG. 2 is a similar view showing the effect of a strong current on the apparatus.
Figure 3:
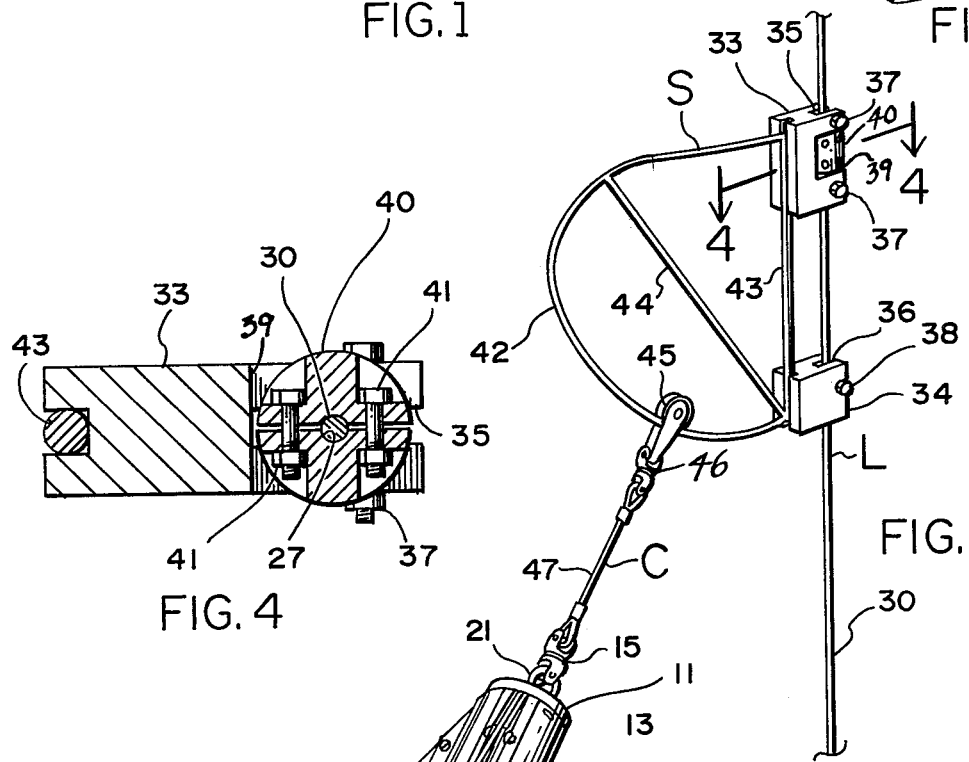
FIG. 3 is an enlarged view of the apparatus.
Figure 4:
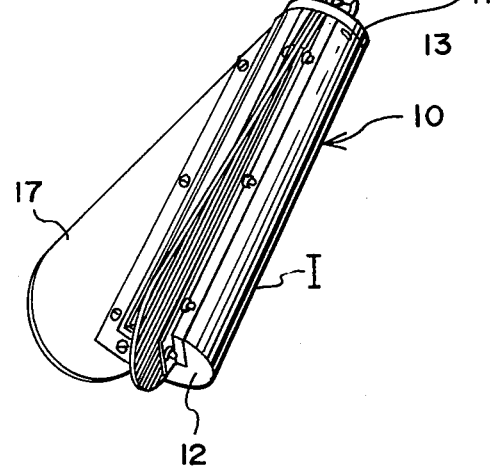
FIG. 4 is a cross sectional view taken along the line 4—4 of FIG. 3.

As shown by FIGS. 1 and 2 the apparatus to anchor the inclinometer housing 10 consists of an anchoring line or cable 30 having a weighted anchor 31 connected at one end and resting on the bottom of the body of water and a float 32 connected to the other end of the cable 30 so as to maintain the line 30 in a vertical position. Secured to the cable 30 at the depth that it is desired to measure the velocity and direction of a current is a standard -S- consists of a pair of rectangular bifuricated support members 33 and 34 having slots 35 and 36 respectively along one side thereof for receiving the anchor line 30 therealong. Bolts 37 and 38 mounted on the members 33 and 34 and extending across the slots 35 and 36 respectively prevent the displacement of the anchor line 30 from the slots 35 and 36. The upper support member 33 is provided with a further slotted portion 39 for receiving a split clamp 40 having a centrally disposed opening 27 for the anchor line 30 formed by semi-circular slots on each of the halves of the split clamp 40 together to grip the anchor line 30 and prevent any vertical movement of the standard -S- on the anchor line 30, but does permit the rotational movement thereof about the anchor line 30.

Extending from the upper and lower support members 33 and 34 is a stay in the form of an arcuate rod 42 whose ends are embedded or otherwise secured to the support members 33 and 34 with a brace member 43 extending therebetween and a cross brace 44 extending diagonally across the curved portion of the stay 42. Rotatably mounted on the stay 42 between the ends of the cross brace 44 is a pulley or sheave block 45 connected to a swivel 46 which in turn is secured to a short cable 47 whose other end is connected to the swivelled connector 15 of the inclinometer housing -I-.

In the normal use of my apparatus for determining the current velocity and directional flow at a desired depth of a body of water, the Standard -S- is fastened to the anchoring cable 30 at the proper distance from the anchor 31 and the apparatus 10 is dropped into the body of water. The various parts of my apparatus will assume their relative positions as shown by FIGS. 1 and 2 with the float 32 so adjusted as to be positioned at approximately the surface of the body of water with the anchoring cable 30 extending vertically. The force of the current will cause the inclinometer housing -I- to lie in the plane of the water flow at an angle thereto determined by the velocity of the current.

There are two forces which are imparted on the anchoring line 30, namely, the horizontal forces of the current impinging on the line 30 and the float 32 and a vertical force effected by the float 32 as the latter bobs up and down following the surface wave motions. These forces which compel the fluttering movement of the line 30 along its full length in addition to vertical jerky movements of the line 30 prevent the inclimometer -I- from indicating accurate readings of the current velocity and direction.

In the conventional appartuses wherein the inclinometer is connected directly to the anchoring line, the fluttering effect of the anchor line compels the inclinometer housing to sway horizontally from side to side out of the plane of the flow of the current, so that the compass reading will vary accordingly. Also, as the float and anchoring cable bob up and down, the jerking motion is transmitted to the inclinometer whereby the vertical angular position of the housing will be constantly changing and will not register the velocity of the current accurately.

With the use of my apparatus described as above in connection with the drawings, any fluttering of the anchoring line 30 will be absorbed by the rotatable support members 33, 34 and not be imparted to the inclinometer -I-. Also, the vertical bobbing action of the float 32 causes the pulley 45 to ride along the arcuate rod 42 of the standard -S- without affecting the angular position of the housing 10 which position is the measure of the velocity of the current. In addition, the fins 17 are made of flexible material to increase the range of the device 10 by reducing the drag effect of the current at higher velocities while at the low velocities of the current the drag effect remains unchanged at its maximum reading for the correspondingly low current velocity.

What I claim as new and desire to secure of Letters Patent is:

1. A housing for a current flow meter comprising a substantially cylindrical member having an axis and end wall portions forming an enclosed chamber for receiving instruments therein, a pair of vanes mounted on said housing, each of said vanes lying substantially in a plane intersecting at substantially right angles at said axis of said housing, said vanes being substantially flexible, symmetrically disposed and tapering upwardly away from said housing and extending from one end of said housing to the other end and engaging said end wall portion at said other end, connecting means mounted at said one end of said housing for anchoring said housing in a body of water in determining current flow direction and velocity.

2. The structure as recited by claim 1 taken in combination with support means, said support means having an arcuate member, roller means mounted on said connecting means and rotatably mounted on said arcuate member.

3. The structure as recited by claim 2 wherein said support means having fastening means for securing said support means to a substantially vertically disposed anchored cable member in said body of water and said arcuate member being elongated and having leg portions secured to said fastening means.

4. The structure as recited by claim 3 wherein said fastening means comprises a pair of block members rotatably mounted on said anchored cable member, one of said pair of block members having a slotted portion, a stop member mounted in said slotted portion and fastened to said anchored cable member preventing the sliding movement of said support means on said anchored cable member and rod means securing said pair of block members together, and said leg portions of said arcuate member being secured to said block members.

5. A standard for a housing containing instruments determining water flow direction and velocity in a body of water comprising fastening means securing said standard to a substantially vertically disposed line anchored in said body of water, said fastening means preventing the sliding movement of said standard along said vertically disposed line but permitting the rotational movement of said standard about said line, a substantially vertically disposed arcuate member, said arcuate member having leg portions secured to said fastening means, roller means mounted on said arcuate member, and further connecting means mounted on said roller means for securing said housing to said roller means.

6. The structure as recited by claim 5 wherein said fastening means comprises a pair of block members rotatably mounted on said vertically disposed line, one of said pair of block members having a slotted portion, a stop member mounted on said slotted portion and fastened to said vertically disposed line preventing the sliding movement on said line, and rod means securing said pair of block members together and said leg portions of said arcuate member being secured to said block members.

* * * * *